(12) United States Patent
Tang et al.

(10) Patent No.: US 8,331,106 B2
(45) Date of Patent: Dec. 11, 2012

(54) ELECTRONIC DEVICE ENCLOSURE AND POWER SUPPLY THEREOF

(75) Inventors: Xian-Xiu Tang, Shenzhen (CN);
Zhen-Xing Ye, Shenzhen (CN);
Chia-Shin Chou, Tu-Cheng (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 315 days.

(21) Appl. No.: 12/834,025

(22) Filed: Jul. 12, 2010

(65) Prior Publication Data

US 2011/0299260 A1 Dec. 8, 2011

(30) Foreign Application Priority Data

Jun. 8, 2010 (CN) .......................... 2010 1 0194924

(51) Int. Cl.
*H05K 7/02* (2006.01)
*H05K 7/04* (2006.01)
(52) U.S. Cl. ....................................................... 361/807
(58) Field of Classification Search .................. 361/807, 361/808, 809, 832, 621; 439/27
See application file for complete search history.

(56) References Cited

U.S. PATENT DOCUMENTS

| | | | | |
|---|---|---|---|---|
| 4,787,216 A * | 11/1988 | Chesnut et al. | ................. | 62/347 |
| 5,352,122 A * | 10/1994 | Speyer et al. | ................... | 439/13 |
| 5,551,882 A * | 9/1996 | Whiteman et al. | ............. | 439/21 |
| 6,089,921 A * | 7/2000 | Chou | ............................ | 439/640 |
| 6,488,510 B2 * | 12/2002 | Li | ................................. | 439/13 |
| 6,567,264 B2 * | 5/2003 | Megason | ................ | 361/679.58 |
| 6,979,200 B2 * | 12/2005 | Ritchie | ......................... | 439/15 |
| 7,125,257 B1 * | 10/2006 | Liang | ............................ | 439/22 |
| 7,381,059 B2 * | 6/2008 | Wong | .............................. | 439/22 |
| 2003/0063435 A1 * | 4/2003 | Megason | ..................... | 361/684 |
| 2004/0120219 A1 * | 6/2004 | Polany et al. | ................. | 367/131 |
| 2007/0274012 A1 * | 11/2007 | Bonasia et al. | ................ | 361/42 |
| 2007/0278996 A1 * | 12/2007 | So | .................................. | 320/107 |
| 2008/0285151 A1 * | 11/2008 | Huang | ......................... | 359/702 |
| 2008/0308643 A1 * | 12/2008 | Larson et al. | ................ | 236/12.1 |
| 2009/0273333 A1 * | 11/2009 | Chang | .......................... | 323/318 |
| 2009/0291570 A1 * | 11/2009 | Wadsworth | .................... | 439/13 |
| 2009/0321241 A1 * | 12/2009 | Zhen | ............................. | 200/532 |
| 2010/0072051 A1 * | 3/2010 | Zhao et al. | .................... | 200/402 |
| 2010/0141194 A1 * | 6/2010 | Koehl | ........................... | 318/434 |
| 2010/0277907 A1 * | 11/2010 | Phipps et al. | ................ | 362/235 |

* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

An electrical device enclosure includes a front panel, a power supply and a switch assembly mounted on the front panel. The power supply includes an alternating current (AC) plug and a power circuit. The AC plug is used to receive an AC voltage. The power circuit is used to convert the AC voltage from the AC plug into a direct current voltage. The switch assembly is connected between the AC plug and the power circuit to turn on/off a connection between the AC plug and the power circuit.

8 Claims, 7 Drawing Sheets

US 8,331,106 B2

ELECTRONIC DEVICE ENCLOSURE AND POWER SUPPLY THEREOF

BACKGROUND

1. Technical Field

The present disclosure relates to electronic device enclosures and, particularly, to an electronic device enclosure having a power supply.

2. Description of Related Art

Presently, for many electronic devices, such as computers, alternating current (AC) sockets which supply AC power to the computers are often arranged at the back of the computers case. Plugging or unplugging the power cord, before turning on or after turning off the computer is inconvenient. Current may still flow from the AC power source to the power supply even after the computer is turned off, which is a waste of power.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
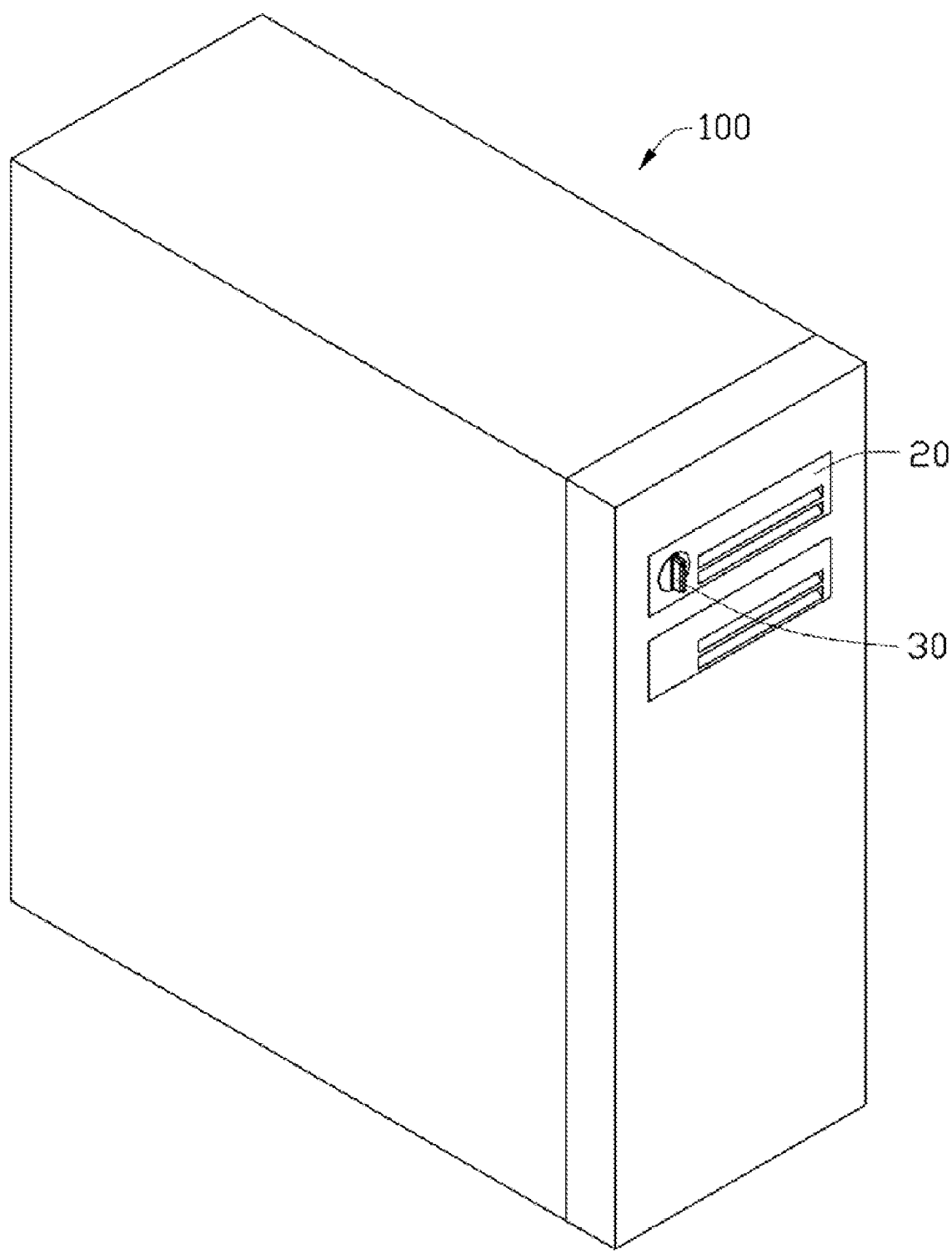
FIG. 1 is a schematic, isometric diagram of an exemplary embodiment of an electronic device enclosure.
Figure 2:
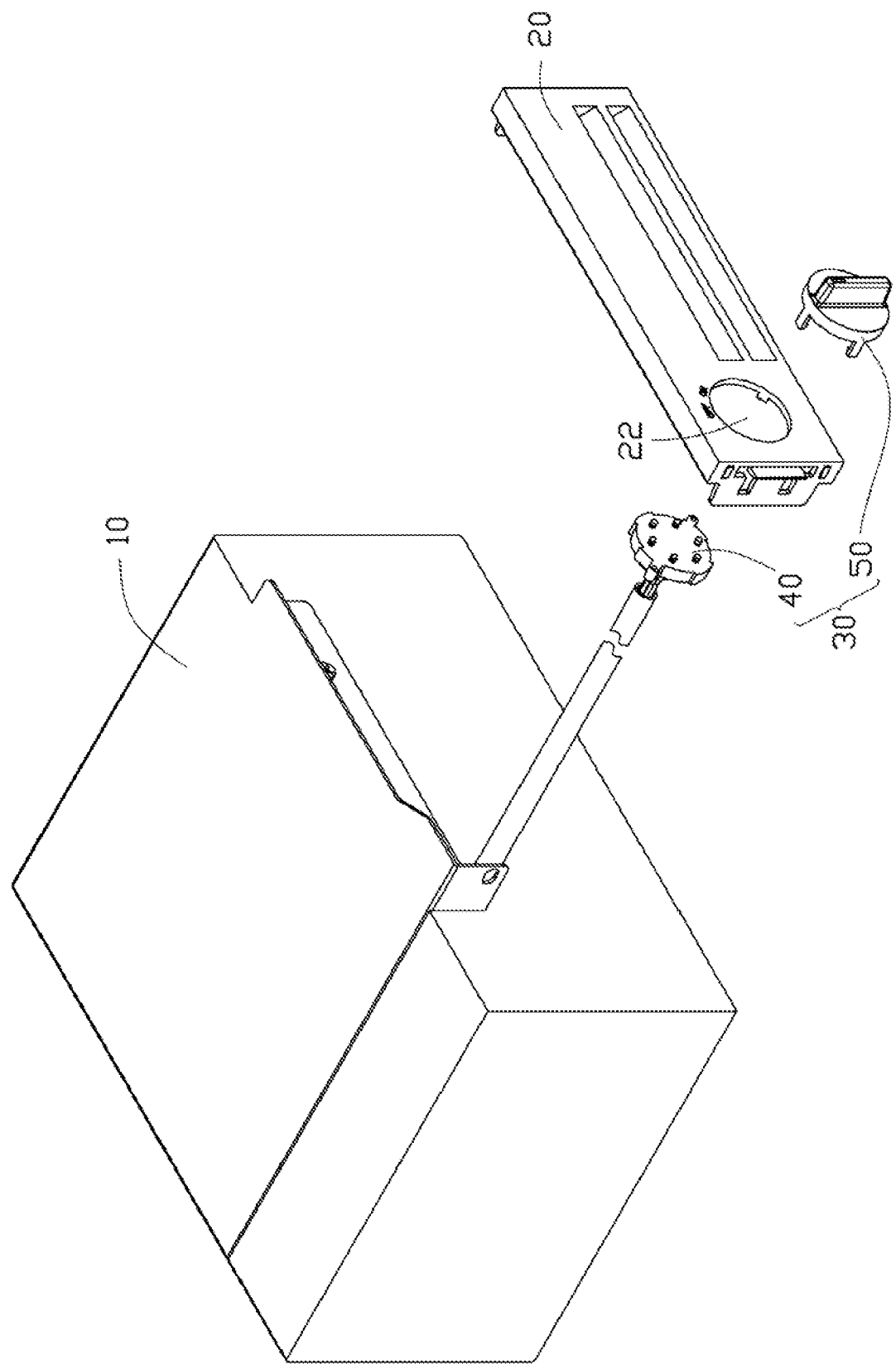
FIG. 2 is a partially exploded, isometric view of the electronic device enclosure of FIG. 1, the electronic device enclosure including a switch assembly and a power supply, the switch assembly including a base and a rotary switch.
Figure 3:
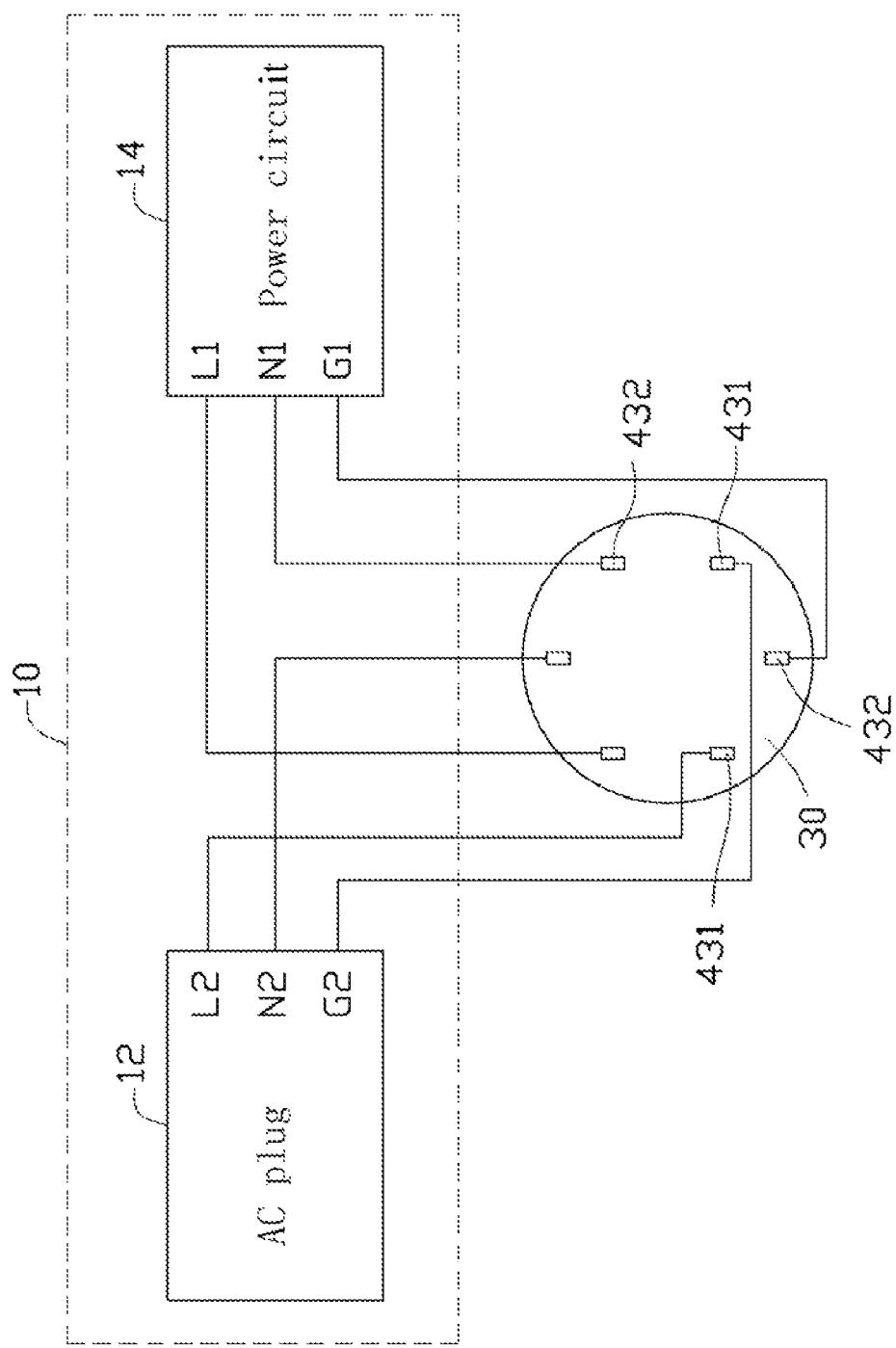
FIG. 3 is a schematic diagram of the switch assembly of FIG. 2, the switch assembly being connected between a power circuit of the power supply and a power plug.

Referring to FIGS. 1 to 3, an exemplary embodiment of an electronic device enclosure 100 includes a power supply 10, a front panel such as a compact disk (CD) driver panel 20, and a switch assembly 30 mounted on the CD driver panel 20. The power supply 10 includes an alternating current (AC) plug 12, and a power circuit 14 to convert an AC voltage from the AC plug 12 into a direct current (DC) voltage. The switch assembly 30 is connected between the AC plug 12 and the power circuit 14, to turn on/off a connection between the AC plug 12 and the power circuit 14. An installation opening 22 is defined in the CD driver panel 20 to install the switch assembly 30. The switch assembly 30 includes a base 40 and a rotary switch 50 engaged with the base 40. The base 40 is circular. The rotary switch 50 is rotatably mounted to the base 40. In the embodiment, the electronic device enclosure 100 is a computer enclosure.

Figure 4:
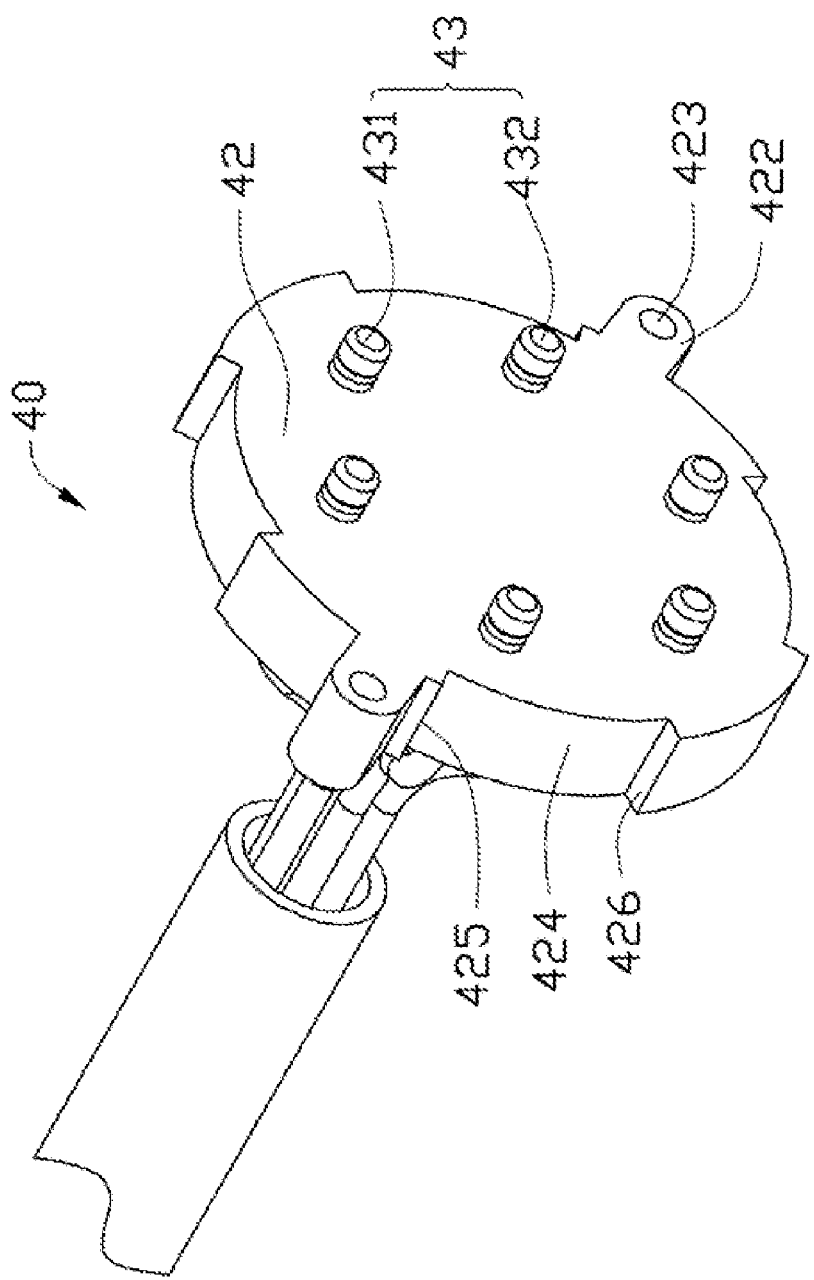
FIG. 4 is an isometric view of the base of the switch assembly of FIG. 2.

Referring to FIG. 4, the base 40 includes a circular plate 42 and three groups of electrical conductors, such as conduction poles 43, mounted on the plate 42. Each group of conduction poles 43 includes a first conduction pole 431 and a second conduction pole 432 adjacent to the first conduction pole 431. The first conduction poles 431 and the second conduction poles 432 of the three groups of conduction poles 43 are alternately equidistantly arranged on the plate 42 along a circumference of the plate 42. The three first conduction poles 431 are connected to a hot line pin L2, a neutral line pin N2, and a ground line pin G2 of the AC plug 12, respectively. The second conduction poles 432 are connected to a hot line terminal L1, a neutral line terminal N1, and a ground line terminal G1 of the power circuit 14, respectively. Each group of conduction poles 43 are used to transmit one type of signal, for example, in one group of conduction poles 43, the first conduction pole 431 is connected to the hot line pin L2 of the AC plug 12 and the second conduction pole 432 is connected to the hot line terminal L1 of the power circuit 14, to transmit the signals between the hot line pin L2 of the AC plug 12 and the hot line terminal L1 of the power circuit 14. Structure of the first and second conduction poles 431 and 432 are the same. The first conduction pole 431 is taken as an example to be described below. The first conduction pole 431 extends through the plate 42, and includes a first terminal exposed through a back surface of the plate 42 and connected to the hot line pin L2, the neutral line pin N2, and the ground line pin G2 of the AC plug 12, and a second terminal opposite to the first terminal and exposed through a front surface of the plate 42. Two mounting portions 422 extend from a circumference of the plate 42, opposite to each other. A mounting hole 423 is defined in each mounting portion 422. Four cutouts 424 are equidistantly defined in the circumference of the plate 42 and extend from the front surface to the back surface of the plate 42. The four cutouts 424 are substantially arc-shaped. First and second stopping portions 425 and 426 are formed at opposite ends of each cutout 424, to bind the corresponding cutout 424. First terminals of the second conduction poles 432 are connected to the hot line terminal L1, the neutral line terminal N1, and the ground line terminal G1 of the power circuit 14, respectively.

Figure 5:
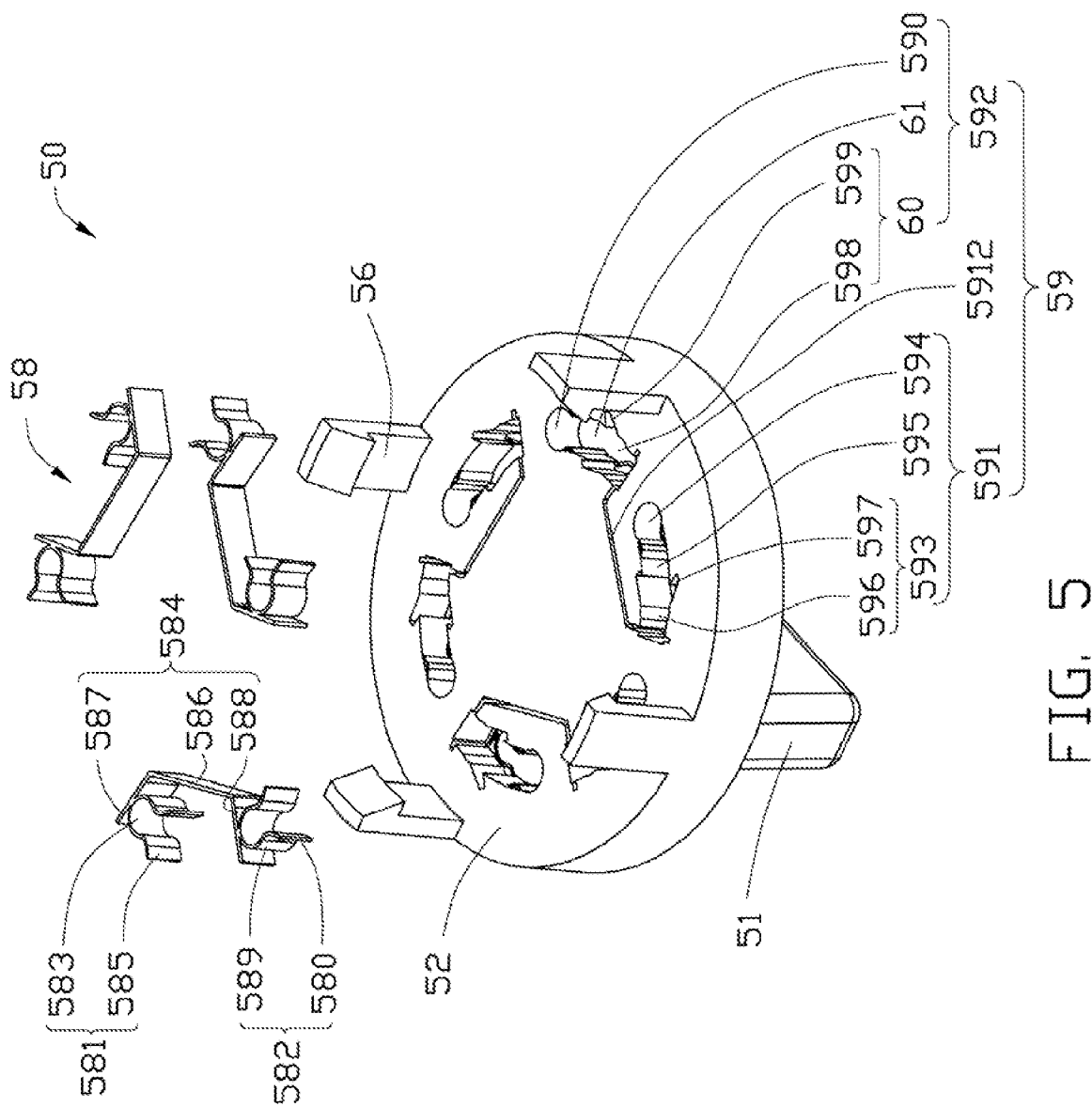
FIG. 5 is an exploded, isometric view of the rotary switch of the switch assembly of FIG. 2, but viewed from another perspective.

Referring to FIG. 5, the rotary switch 50 includes a circular faceplate 52, a knob 51 perpendicularly extending from a first surface of the faceplate 52, four hooks 56 perpendicularly and equidistantly extending from a second surface of the faceplate 52 opposite to the first surface, corresponding to the four cutouts 424, and three connection modules 58 to connect to the three group of conduction poles 43. The hooks 56 are adjacent to a circumference of the faceplate 52. Each connection module 58 includes a first latching element 581, a second latching element 582, and a connection element 584 connected between the first and second latching elements 581 and 582. The first and second latching elements 581 and 582 are substantially "Ω" shaped. Structure of the first and second latching elements 581 and 582 are the same. The first latching element 581 is taken as an example to be described below. The first latching element 581 includes a substantially C-shaped holding portion 583 corresponding to the second terminal of the corresponding first conduction pole 431, and two latching portions 585 oppositely extending from two opposite ends of the holding portion 583. An arc-shaped conjunction portion (not labeled) is connected between each latching portion 585 and the corresponding end of the holding portion 583, the conjunction portions of the first latching element 581 bows towards each other. A distance between the conjunction portions of the first latching element 581 is smaller than the diameter of the corresponding first conduction pole 431. The connection element 584 is substantially U-shaped, and includes a connection wall 586 and first and second end walls 587 and 588 extending from two opposite ends of the connection wall 586. An obtuse angle is formed between the connection wall 584 and each of the first and second end walls 587 and 588. A middle of the holding portion 583 of the first latching element 581 is attached to the first end wall 587, with the latching portions 585 facing the second end wall 588. A middle of the holding portion 589 of the second latching element 582 is attached to the second end wall 588, opposite to the first end wall 587, with the latching portion 582 facing the first end wall 587.

Three installation slots 59, corresponding to the three group of conduction poles 43 of the base 40, are defined in the second surface of the faceplate 52 of the rotary switch 50. Each installation slot 59 includes a first slot 591, a second slot 592, and a connection slot 5912 connected between the first and second slots 591 and 592. The first and second slots 591 and 592 are substantially "peanut-shaped". The structure of the first and second slots 591 and 592 are the same. The first slot 591 is taken as an example to be described. The first slot 591 includes a fixing slot 593 as a first position of the first slot 591, a first locating slot 594 as a second position of the first slot 591, corresponding the second terminal of the conduction pole 43, and a transition slot 595 communicated between the fixing slot 593 and the first locating slot 594. The fixing slot 593 includes a second locating slot 596 corresponding to the holding portion 583 of the first latching element 581, and two latching slots 597, corresponding to the latching portions 585 of the first latching element 581. The latching slots 597 angularly extend from opposite sides of the second locating slot 596. The connection slot 5912 is substantially U-shaped, to receive the connection wall 586 of the connection element 584. The connection slot 5912 includes a first terminal communicated with the second locating slot 596 of the first slot 591 and a second terminal communicated with the second locating slot 598 of the second slot 592. A width of a conjunction between the transition slot 595 and the first locating slot 594 is smaller a diameter of the first conduction pole 431. Similarly, the second through slot 592 includes a fixing slot 60 as a first position of the second slot 592, a first locating slot 590 as a second position of the second slot 592, corresponding to the second terminal of the conduction pole 43, and a transition slot 61 communicated between the fixing slot 60 and the first locating slot 590. The fixing slot 60 includes a second locating slot 598 corresponding to the holding portion 589 of the second latching element 582 and two latching slots 599, corresponding to the latching portion 580 of the second latching element 582. A width of a conjunction between the transition slot 61 and the first locating slot 590 is smaller than the diameter of the second conduction pole 432.

Figure 6:
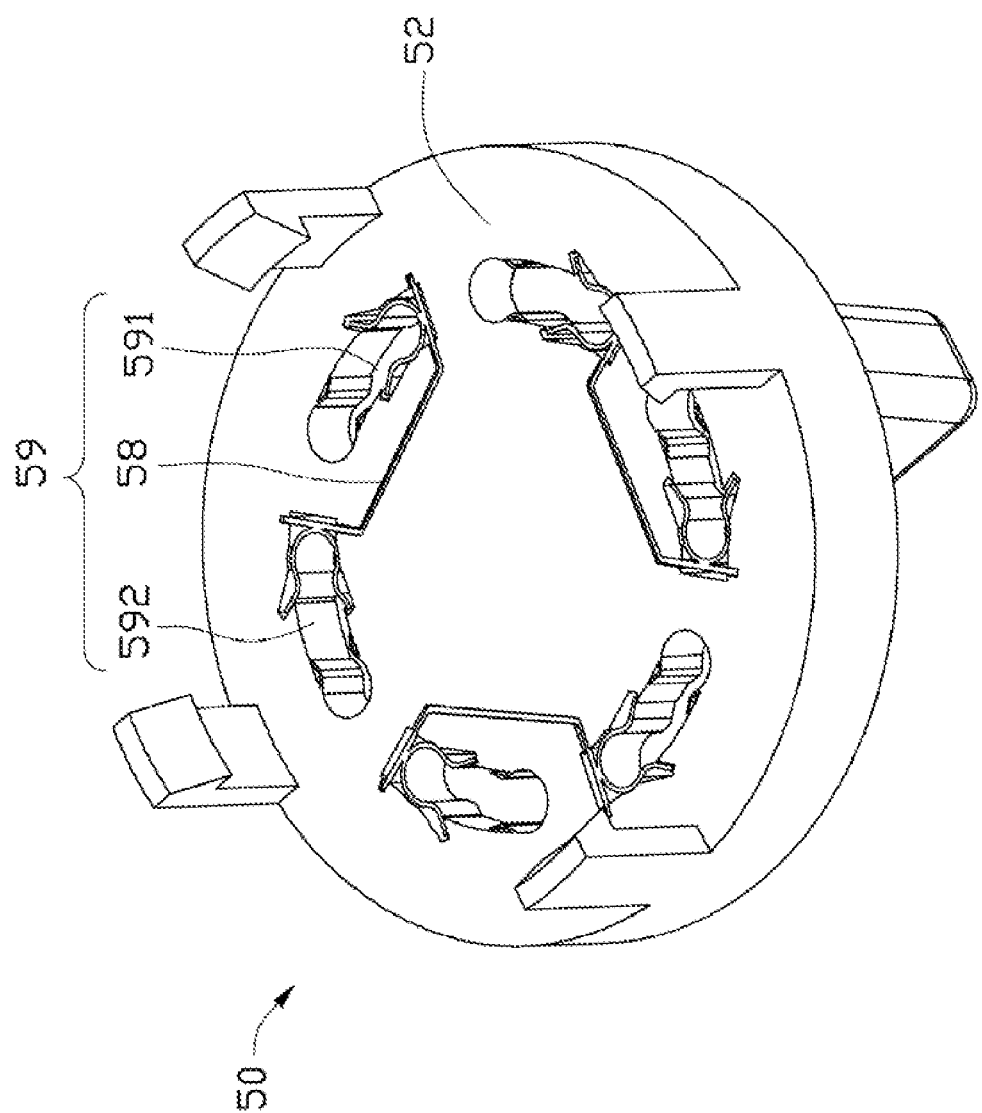
FIG. 6 is an assembled view of the rotary switch of FIG. 5.

Referring to FIG. 6, in assembling the rotary switch 50, the three connection modules 58 are received in the corresponding installation slots 59. The connection element 584 of each connection module 58 is received in the connection slot 5912 of the installation slot 59. The holding portion 583 of the first latching element 581 is received in the second locating slot 596 of the first slot 591. The holding portion 589 of the second latching element 582 is received in the second latching slot 598 of the second slot 592. The outer surface of the holding portion 583 of the first latching element 581 resists against the sidewall bounding the second location slot 596 of the first slot 591. The outer surface of the holding portion 589 of the second latching element 582 resists against the sidewall bounding the second locating slot 598 of the second slot 592. The latching portions 585 of the first latching element 581 are engaged in the latching slots 597 of the first slot 591. The latching portions 580 of the second latching element 582 are engaged in the latching slots 599 of the second slot 592.

Figure 7:
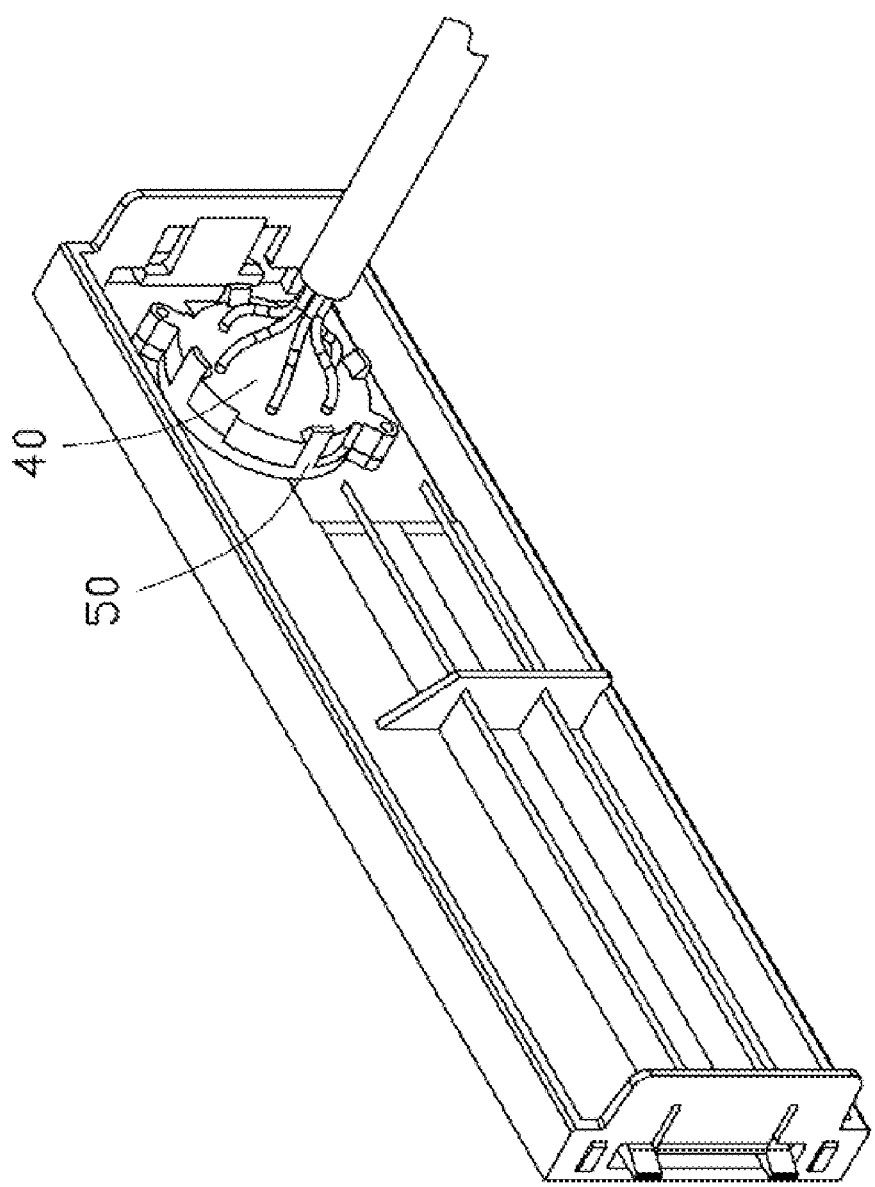
FIG. 7 is a schematic diagram of the switch assembly, the switch assembly being fixed on the electronic device enclosure of FIG. 2.

Referring to FIG. 7, the rotary switch 50 is attached to the CD driver panel 20, with the faceplate 52 received in the installation opening 22 of the CD driver panel 20. The first surface of the faceplate 52 and the outside surface of the CD-drive panel 20 are coplanar. The second terminals of the first and second conduction poles 431 and 432 are received the corresponding first and second slots 591 and 592. The hooks 56 of the rotary switch 50 extend through the corresponding cutouts 424, with distal ends of the hooks 56 grabbing the back surface of the faceplate 40. The switch assembly 30 is fixed on the CD driver panel 20 by screws extending through the mounting holes 423 of the two mounting portion 422 of the base 40 to be screwed to the CD driver panel 20. The hooks 56 of the rotary switch 50 may slide between the first and second stopping portions 425 and 426, thereby the rotary switch 50 is rotatable relative to the plate 42.

In use, the power circuit 14 receives the AC voltage by the AC plug 12. When the rotary switch 50 is rotated to make the second terminal of each first conduction pole 431 be located in the corresponding first locating slot 594 of the first slot 591 and the second terminal of each second conduction pole 432 be located in the corresponding first locating slot 590 of the second slot 592, the second terminals of the first and second conduction poles 431 and 432 do not contact the corresponding first and second latching elements 581 and 582. The first conduction poles 431 are disconnected from the corresponding second conduction poles 432. The AC plug 12 is disconnected from the power circuit 14. When the rotary switch 50 is rotated to make the second terminal of each first conduction pole 431 to snap in contact with the holding portion 583 of the corresponding first latching element 581 and the second terminal of the each second conduction pole 432 to snap in contact with the holding portion 589 of the corresponding second latching element 582, the first and second conduction poles 431 and 432 are connected by the corresponding connection module 58. Therefore, the AC plug 12 is connected to the power circuit 14.

The first and second stopping portions 425 and 426 are used to resist against the hooks 56, to prevent the hooks 56 from disengaging from the cutouts 424.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An electronic device enclosure, comprising:
   a front panel;
   a power supply comprising an alternating current (AC) plug configured to receive an AC voltage, and a power circuit configured to convert the AC voltage from the AC plug into a direct current voltage; and
   a switch assembly mounted on the front panel and connected between the AC plug and the power circuit, the switch assembly being configured to turn on or turn off a connection between the AC plug and the power circuit;
   wherein the switch assembly comprises a base and a rotary switch movably mounted to the base, a first electrical conductor is mounted to the base and connected to the AC plug, a second electrical conductor is mounted to the base and connected to the power circuit, an installation slot is defined in the rotary switch, a connection module is received in the installation slot and electrically connected between the first and second electrical conductors, wherein when the first and second electrical conductors are located at a first position of the installation slot, the first electrical conductor and the second electrical conductor do not contact the connection module, the power circuit is disconnected from the power supply; wherein when the first and second electrical conductors are located at a second position of the installation slot to contact with the connection module, the first electrical conductor is connected to the second electrical conductor by the connection module, the power supply is connected to the AC plug.

2. The electronic device enclosure of claim 1, wherein the connection module comprises a first latching element, a second latching element, and a connection element connected between the first and second latching elements, the installation slot comprises a first slot, a second slot, and a connection slot communicated between the first and second slots, each of the first and second slots comprises a fixing slot to receive the corresponding one of the first and second latching elements, a first locating slot to receive the corresponding one of the first and second electrical conductors in the first position, and a transition slot communicated between the fixing slot and the first locating slot, wherein when the first and second electrical conductors are snapped in contact with the first and second latching elements, respectively, the first and second electrical conductors are located in the second position.

3. The electronic device enclosure of claim 2, wherein each of the first and second latching elements comprises a holding portion and two latching portions extending from opposite ends of the holding portion, each fixing slot comprises a second locating slot receiving the holding portion of the corresponding one of the first and second latching elements, and two latching slots receiving the two latching portions, respectively.

4. The electronic device enclosure of claim 1, wherein the base comprises a plate, the first and second electrical conductors are mounted to the plate, a cutout is defined in a circumference of the plate, the rotary switch comprises a faceplate, a knob extending from a first surface of the faceplate for being operated to rotate the rotary switch, and a hook extending from a second surface opposite to the first surface of the faceplate and movably engaged in the cutout, the installation slot is defined in the second surface of the faceplate.

5. A power supply for an electronic device enclosure, the power supply comprising:
an alternating current (AC) plug configured to receive an AC voltage;
a power circuit configured to convert the AC voltage into a direct current voltage; and
a switch assembly connected between the AC plug and the power circuit, the switch assembly being configured to turn on or turn off a connection between the AC plug and the power circuit,
wherein the switch assembly comprises a base and a rotary switch movably mounted to the base, a first electrical conductor is mounted to the base and connected to the AC plug, a second electrical conductor is mounted to the base and connected to the power circuit, an installation slot is defined in the rotary switch, a connection module is received in the installation slot and electrically connected between the first and second electrical conductors, wherein when the first and second electrical conductors are located at a first position of the installation slot, the first electrical conductor and the second electrical conductor do not contact the connection module, the power circuit is disconnected from the power supply; wherein when the first and second electrical conductors are located at a second position of the installation slot to contact with the connection module, the first electrical conductor is connected to the second electrical conductor by the connection module, the power supply is connected to the AC plug.

6. The power supply of claim 5, wherein the connection module comprises a first latching element, a second latching element, and a connection element connected between the first and second latching elements, the installation slot comprises a first slot, a second slot, and a connection slot communicated between the first and second slots, each of the first and second slots comprises a fixing slot to receive the corresponding one of the first and second latching elements, a first locating slot to receive the corresponding one of the first and second electrical conductors in the first position, and a transition slot communicated between the fixing slot and the first locating slot, wherein when the first and second electrical conductors are snapped in contact with the first and second latching elements, respectively, the first and second electrical conductors are located in the second position.

7. The power supply of claim 6, wherein each of the first and second latching elements comprises a holding portion and two latching portions extending from opposite ends of the holding portion, each fixing slot comprises a second locating slot receiving the holding portion of the corresponding one of the first and second latching elements, and two latching slots receiving the two latching portions, respectively.

8. The power supply of claim 5, wherein the base comprises a plate, the first and second electrical conductors are mounted to the plate, a cutout is defined in a circumference of the plate, the rotary switch comprises a faceplate, a knob extending from a first surface of the faceplate for being operated to rotate the rotary switch, and a hook extending from a second surface opposite to the first surface of the faceplate and movably engaged in the cutout, the installation slot is defined in the second surface of the faceplate.

\* \* \* \* \*